US009598988B2

(12) United States Patent
Kong et al.

(10) Patent No.: US 9,598,988 B2
(45) Date of Patent: Mar. 21, 2017

(54) LUBRICATION SYSTEM FOR FOUR-STROKE ENGINE

(71) Applicant: SUZHOU CLEVA PRECISION MACHINERY & TECHNOLOGY CO., LTD, Suzhou (CN)

(72) Inventors: Zhao Kong, Suzhou (CN); Ning Guo, Suzhou (CN); Gan Chen, Suzhou (CN); Keya Feng, Suzhou (CN)

(73) Assignee: SUZHOU CLEVA PRECISION MACHINERY & TECHNOLOGY CO., LTD., Suzhou (CN)

( * ) Notice: Subject to any disclaimer, the term of this patent is extended or adjusted under 35 U.S.C. 154(b) by 189 days.

(21) Appl. No.: 14/568,129

(22) Filed: Dec. 12, 2014

(65) Prior Publication Data

US 2015/0136065 A1 May 21, 2015

Related U.S. Application Data

(63) Continuation of application No. PCT/CN2013/000688, filed on Jun. 8, 2013.

(30) Foreign Application Priority Data

Jun. 15, 2012 (CN) .......................... 2012 1 0198826
May 29, 2013 (CN) .......................... 2013 1 0207637

(51) Int. Cl.
*F01M 1/04* (2006.01)
*F01M 1/12* (2006.01)
(Continued)

(52) U.S. Cl.
CPC ................ *F01M 1/12* (2013.01); *F01M 1/02* (2013.01); *F01M 9/10* (2013.01); *F01M 11/02* (2013.01);
(Continued)

(58) Field of Classification Search
CPC . F01M 1/04; F01M 1/16; F01M 11/02; F02B 2075/027; F02B 2075/025
(Continued)

(56) References Cited

U.S. PATENT DOCUMENTS 4,958,613 A * 9/1990 Hiraoka ............. F01M 13/0416
123/572
5,081,959 A * 1/1992 Akiyama .................. F01P 3/08
123/41.35
(Continued)

*Primary Examiner* — Hung Q Nguyen
*Assistant Examiner* — Charles Brauch
(74) *Attorney, Agent, or Firm* — Perkins Coie LLP

(57) ABSTRACT

An engine includes an oil pan used for storing lubricating oil, a crankcase, a cam box, a rocker, and a distribution chamber used for separating oil & gas mixture into oil mist and liquid oil. A lubricating system comprises: the oil pan and the crankcase are communicated through an oil supply passage, and a one-way valve is disposed in the oil supply passage; the crankcase and the distribution chamber are communicated through a first oil conveying passage, and a one-way valve is disposed in the first oil conveying passage; the distribution chamber and the cam box are communicated through a second oil conveying passage; the cam box and the rocker chamber are communicated through a third oil conveying passage; the rocker chamber and the crankcase are communicated through at least one oil return passage, and a one-way valve is disposed in the oil return passage.

11 Claims, 17 Drawing Sheets

(51) Int. Cl.
  F01M 9/10 (2006.01)
  F01M 11/02 (2006.01)
  F01M 1/02 (2006.01)
  *F02B 75/02* (2006.01)
  *F01M 1/16* (2006.01)
  *F01M 11/06* (2006.01)
  *F01M 13/04* (2006.01)
  *F16N 7/32* (2006.01)

(52) U.S. Cl.
  CPC ................. *F01M 1/04* (2013.01); *F01M 1/16* (2013.01); *F01M 11/065* (2013.01); *F01M 13/0416* (2013.01); *F01M 2011/023* (2013.01); *F02B 2075/025* (2013.01); *F02B 2075/027* (2013.01); *F16N 7/32* (2013.01)

(58) Field of Classification Search
  USPC .................................................... 123/196 CP
  See application file for complete search history.

(56) References Cited

U.S. PATENT DOCUMENTS

| | | | | |
|---|---|---|---|---|
| 6,164,249 A | * | 12/2000 | Honold | F02F 3/22 |
| | | | | 123/41.35 |
| 2001/0027890 A1 | * | 10/2001 | Bria | B60K 3/04 |
| | | | | 180/291 |
| 2001/0029910 A1 | * | 10/2001 | Ito | F01L 1/024 |
| | | | | 123/41.65 |
| 2002/0000344 A1 | * | 1/2002 | Takada | F01M 1/02 |
| | | | | 184/6.5 |
| 2004/0244783 A1 | * | 12/2004 | Ookawa | F01M 13/022 |
| | | | | 123/572 |

* cited by examiner

LUBRICATION SYSTEM FOR FOUR-STROKE ENGINE

CROSS REFERENCE TO RELATED APPLICATIONS

This application is a continuation of PCT/CN2013/000688 filed Jun. 8, 2013, which claims priority to CN 201310207637.3 filed May 29, 2013, and CN 201210198826.4 file Jun. 15, 2012, all of which are incorporated herein by reference.

TECHNICAL FIELD

The present invention relates to a four-stroke engine lubricating system.

BACKGROUND ART

Like a hand-held mower (shears) and a knapsack operation machine targeted to vert, conventional two-stroke and four-stroke small-size general engines have been widely used as engines of the operation machines that drive operating personnel to hold by hands or bear on the back for operation. Since contaminant discharge provisions become stricter, the need of changing a drive source from a two-stroke engine into a four-stroke engine is increasingly improved. However, the four-stroke engine has a more complicated lubricating system which causes the engine to help little when operating in a leant angle. Lubrication becomes the major design issue of each engine vendor. At present, only Honda produces four-stroke engines that can work under various leant angles according to EP835987 patent technology in mass production. According to the technology, a special oil tank is employed to surround a rotary blade installed on a crank shaft so as to produce oil mist. However, the engine designed in this manner is wider, heavier and more expensive. Moreover, American patent U.S. Pat. No. 6,213,079 of FUJI ROBIN discloses a lubricating system. However, this lubricating system is more complicated. Particularly, a complicated oilway channel is arranged on a cylinder block, so that the processing is complicated and the cost is improved.

SUMMARY OF THE INVENTION

The present invention provides a four-stroke engine lubricating system which has excellent lubrication effect, simple structure and low cost, and is capable of keeping an engine to have normal lubricating function when the engine is either in an inverted state or in a leant state. The four-stroke engine lubricating system is achieved through the following technical solution.

A four-stroke engine lubricating system is provided, wherein the four-stroke engine includes: an oil pan used for storing lubricating oil, a crankcase, a cam box, a rocker, and a distribution chamber communicated with the oil pan and used for separating oil & gas mixture into oil mist and liquid oil. The four-stroke engine lubricating system is characterized in that the lubricating system is as follows: the oil pan and the crankcase are communicated through an oil supply passage, and a first one-way valve is disposed in the oil supply passage. The crankcase and the distribution chamber are communicated through a first oil conveying passage, and a second one-way valve is disposed in the first oil conveying passage. The distribution chamber and the cam box are communicated through a second oil conveying passage. The cam box and the rocker chamber are communicated through a third oil conveying passage. Moreover, the rocker chamber and the crankcase are communicated through at least one oil return passage, and a third one-way valve is disposed in the oil return passage Preferably, the lubricating system further includes a cylinder and a cylinder block, and the oil supply passage is at least partially spliced by the cylinder and the cylinder block.

Preferably, one end of the oil supply passage is provided with an oil nozzle; the oil nozzle is located on the cylinder and below a bottom dead centre of a piston so that the oil nozzle is in an opening state all the time.

Preferably, the quantity of the at least one oil return passage is two, and the third one-way valve is disposed in each oil return passage so that lubricating oil can only flow from the rocker chamber towards the crankcase.

Preferably, the oil return passage is provided with an oil return opening on the cylinder; the oil return opening is located below the bottom dead centre of the piston, so that the oil return opening is in an opening state all the time.

Preferably, the oil return passage is provided with a bottom hole and a top hole; when the engine is used in an upright manner, the lubricating oil in the rocker chamber enters the oil return passage through the bottom hole; and when the engine is used in an inverted manner, the lubricating oil in the rocker chamber enters the oil return passage through the top hole.

Preferably, the four-stroke engine further includes an air filter; the rocker chamber and the air filter are communicated through an air course.

Preferably, the distribution chamber is a cavity chamber consisting of a wall and a bottom cover.

Preferably, an oil return hole is disposed on the bottom cover, and the lubricating oil enters the oil pan through the oil return hole.

Preferably, an air inlet hole and an air outlet hole are disposed in the distribution chamber; oil & gas in the first oil conveying passage enter the distribution chamber through the air inlet hole; and the oil & gas in the distribution chamber enter the second oil conveying passage through the air outlet hole.

Preferably, the four-stroke engine further includes an oil pump, wherein the oil pump provides power for the lubricating oil to flow in the lubricating system Compared with the prior art, the four-stroke engine lubricating system disclosed by the present invention can keep excellent lubricating effect at any position, simplifies the structure of the entire lubricating system, and reduces the contaminant emission and manufacturing cost at the same time.

DETAILED DESCRIPTION OF THE PREFERRED EMBODIMENTS

The present invention will be further described hereinafter with reference to the specific embodiments.

Figure 1:
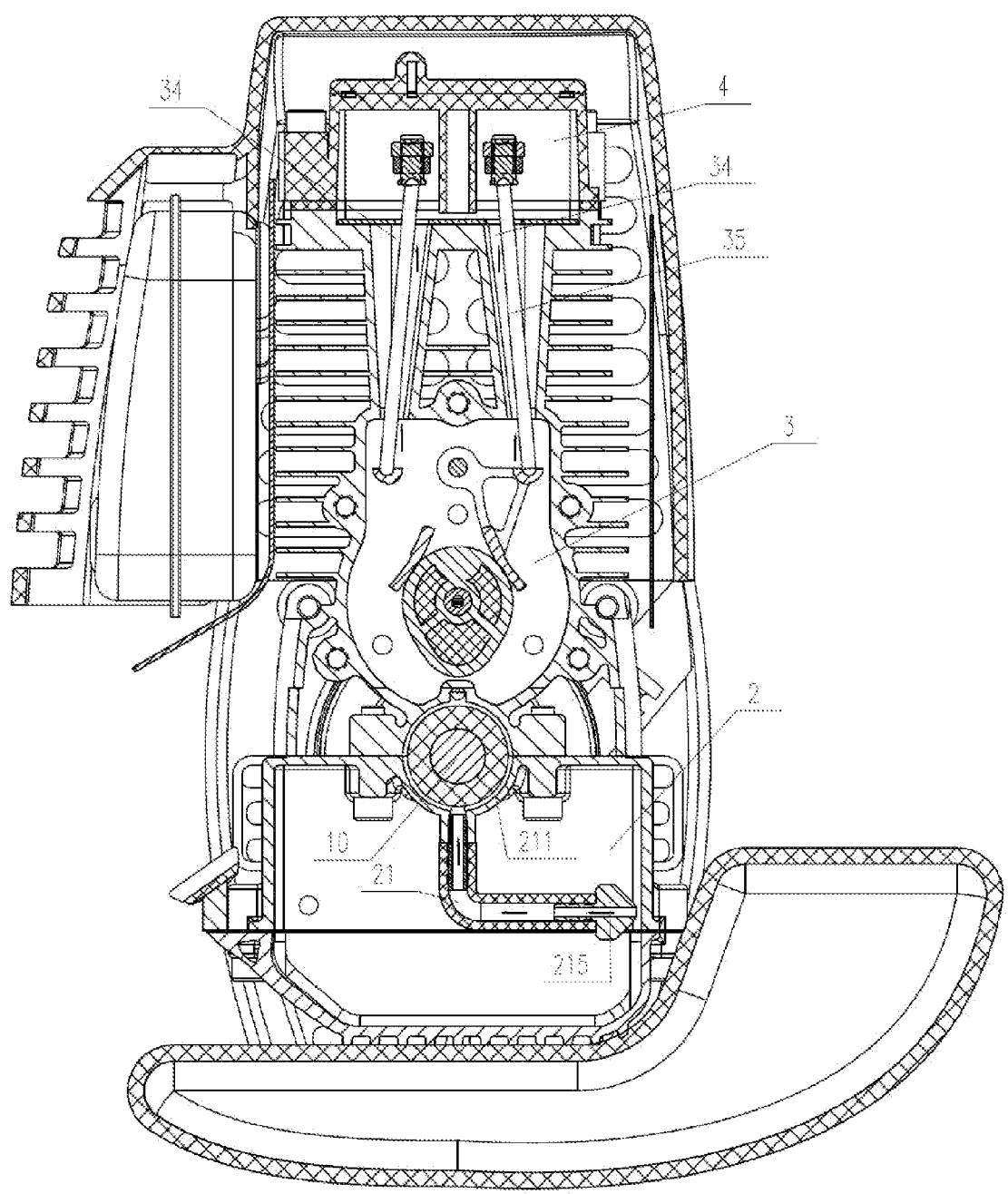
FIG. 1 is a cross-sectional view of a first embodiment of the present invention.
Figure 2:
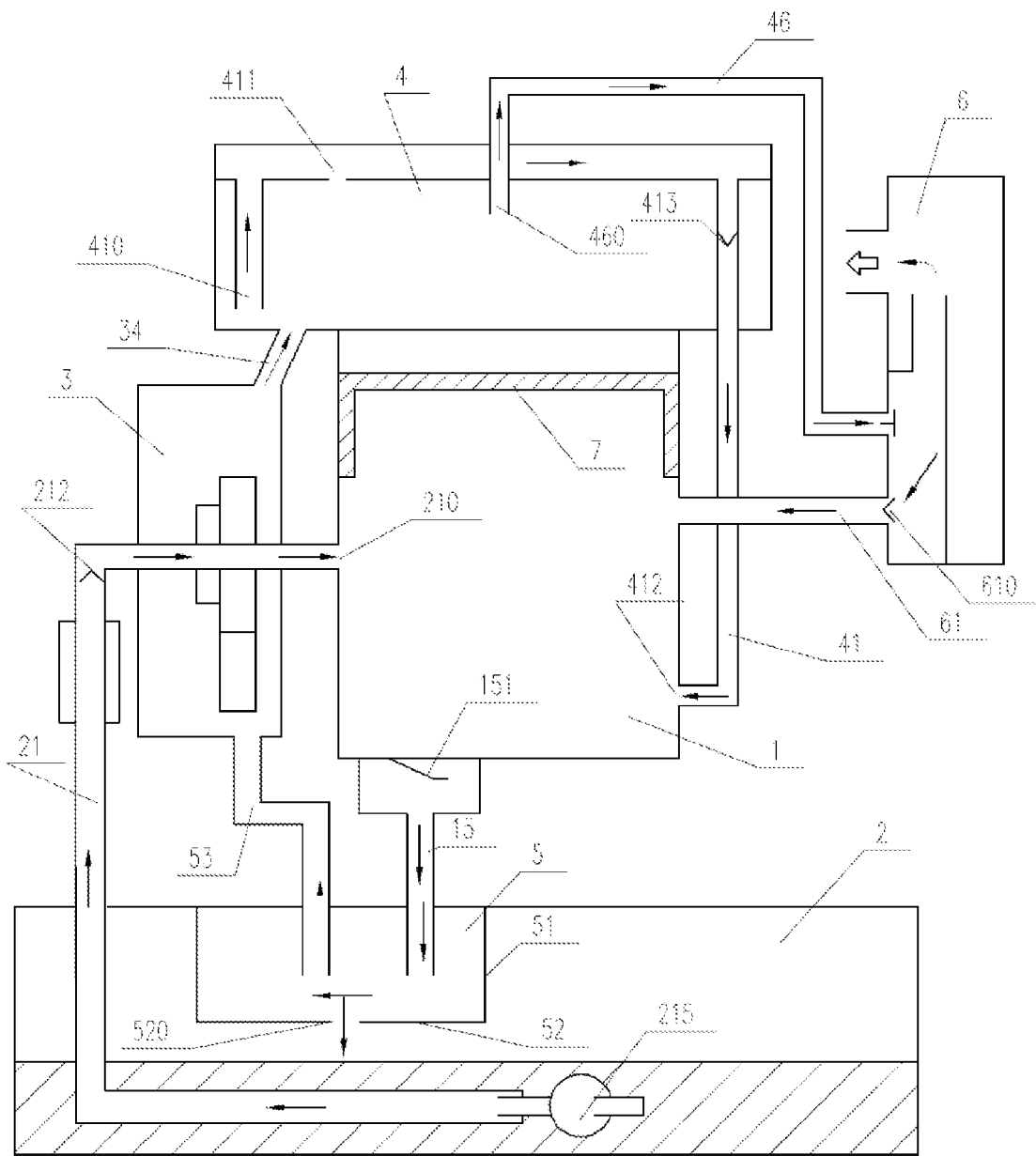
FIG. 2 is a schematic view of a lubricating system of the first embodiment of the present invention.
Figure 3:
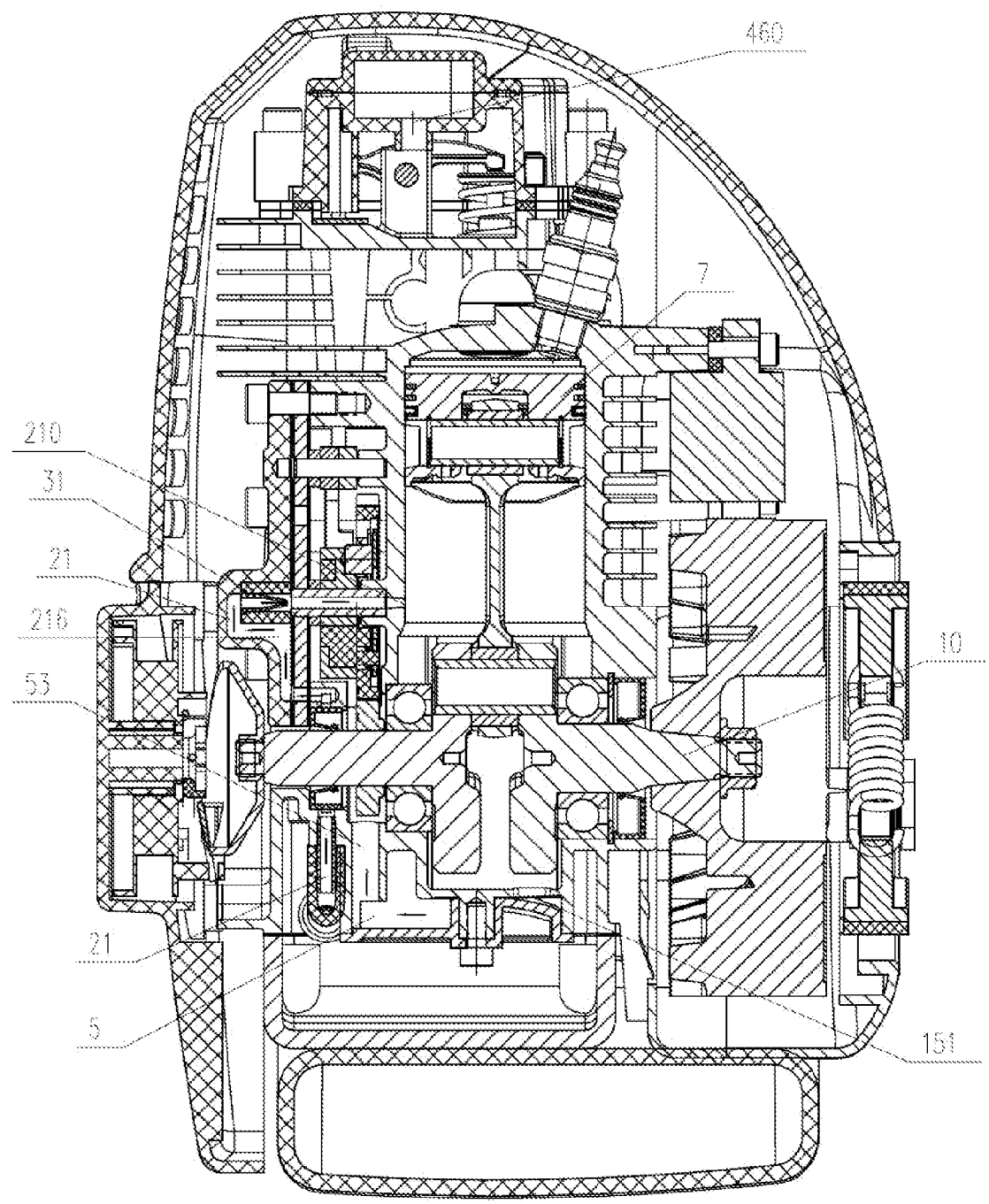
FIG. 3 is a cross-sectional view of the first embodiment of the present invention.
Figure 4:
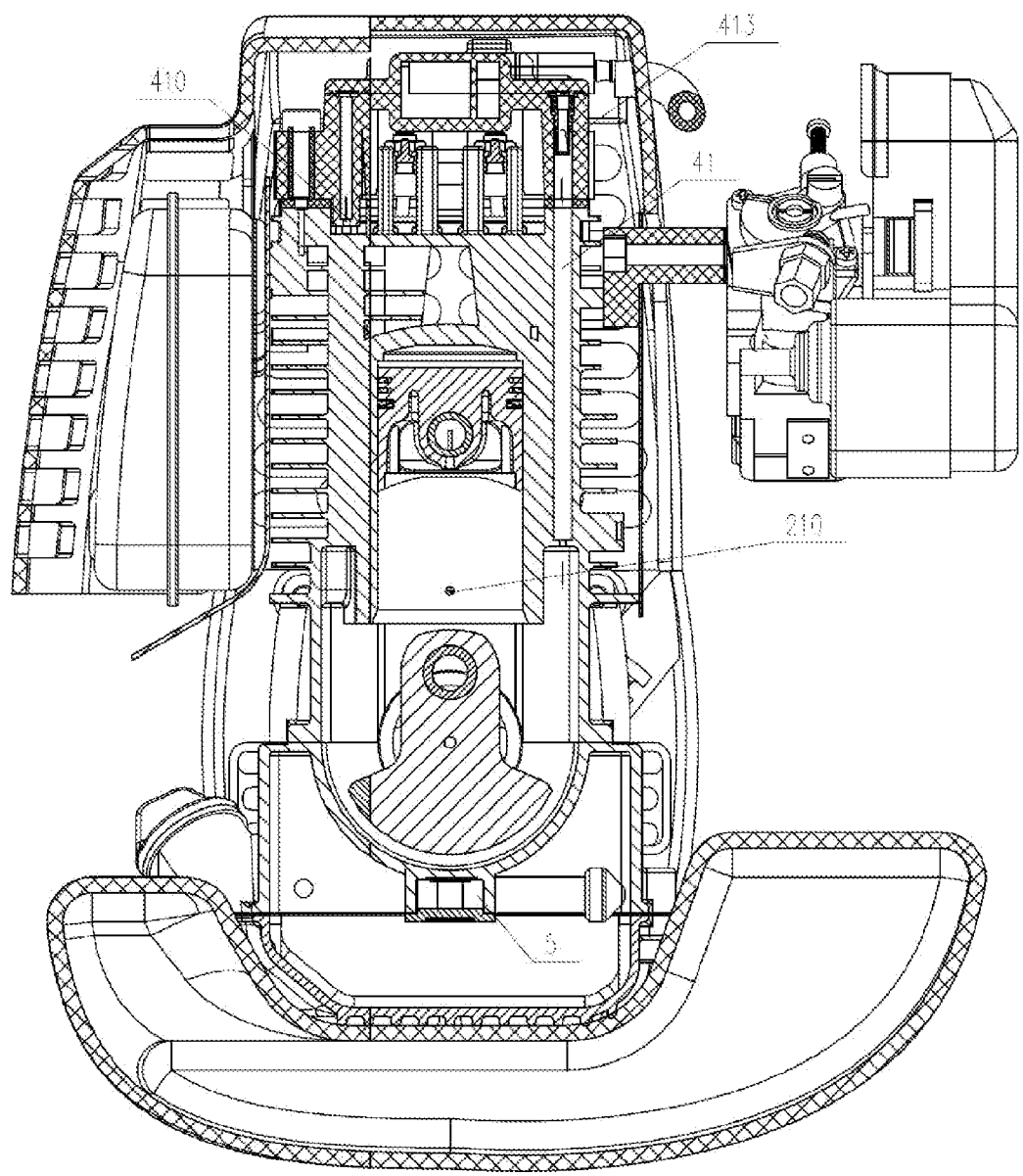
FIG. 4 is a cross-sectional view of the first embodiment of the present invention.
Figure 5:
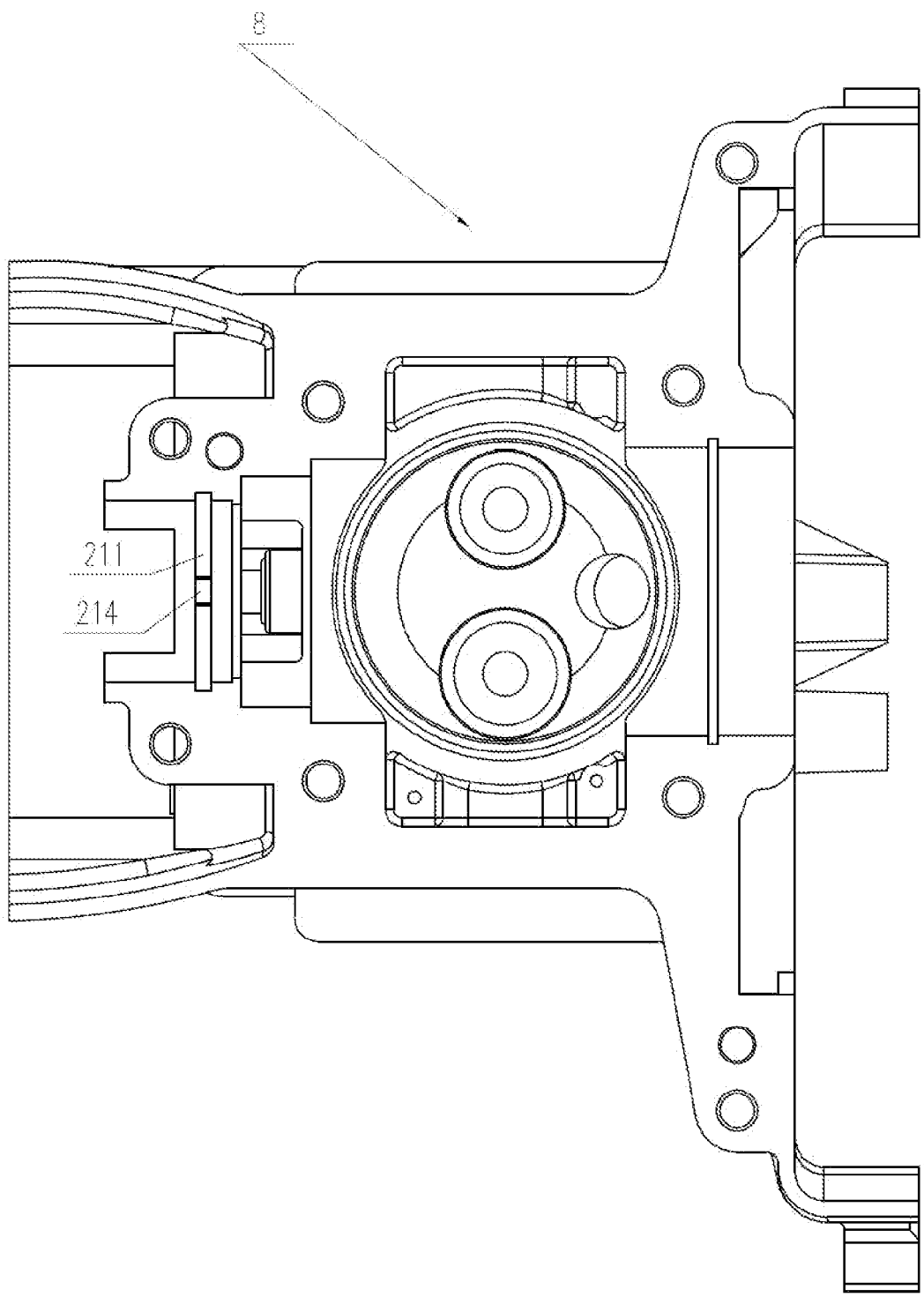
FIG. 5 is a vertical view of a cylinder of the first embodiment of the present invention.
Figure 6:
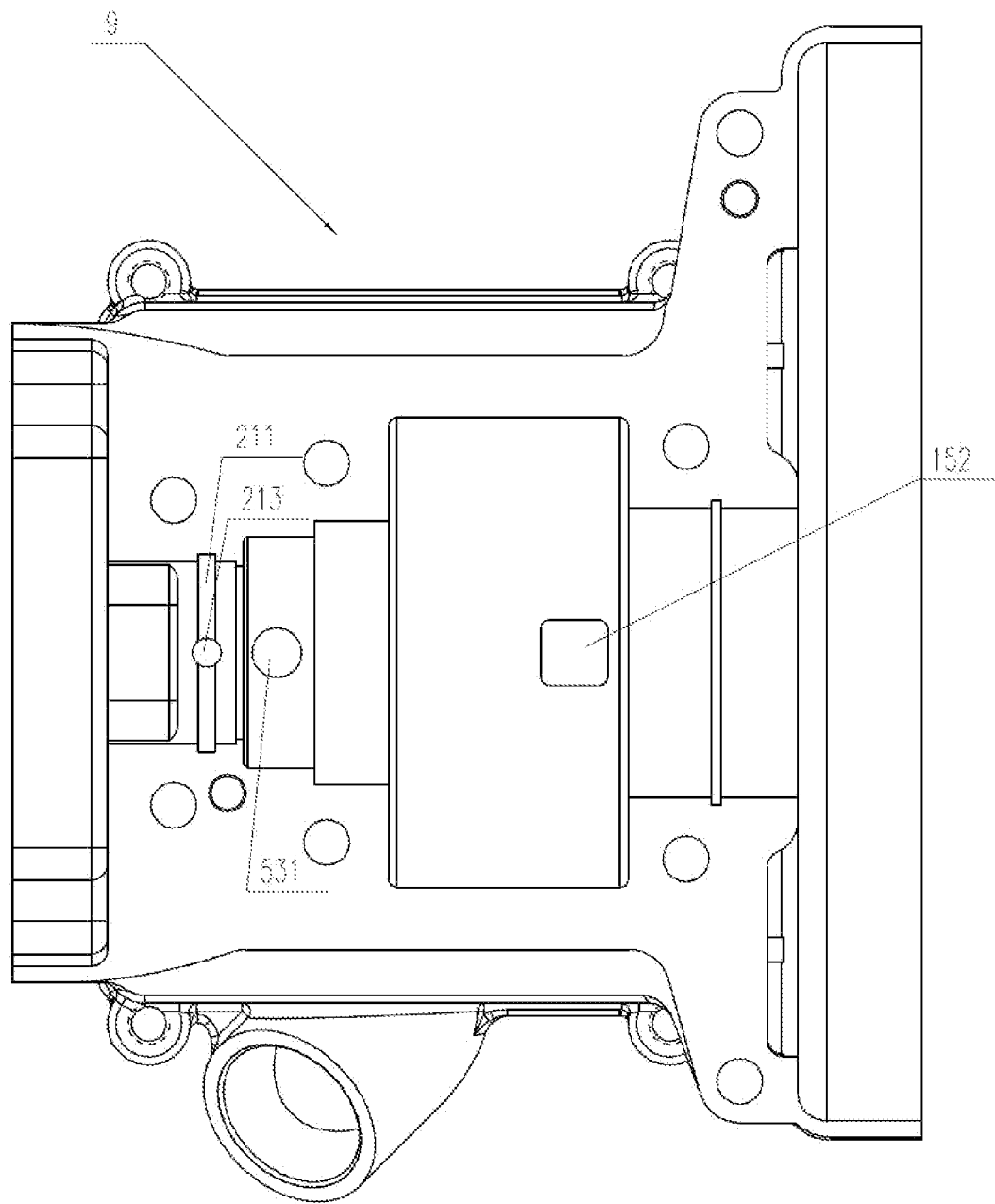
FIG. 6 is a top view of the cylinder of the first embodiment of the present invention.
Figure 7:
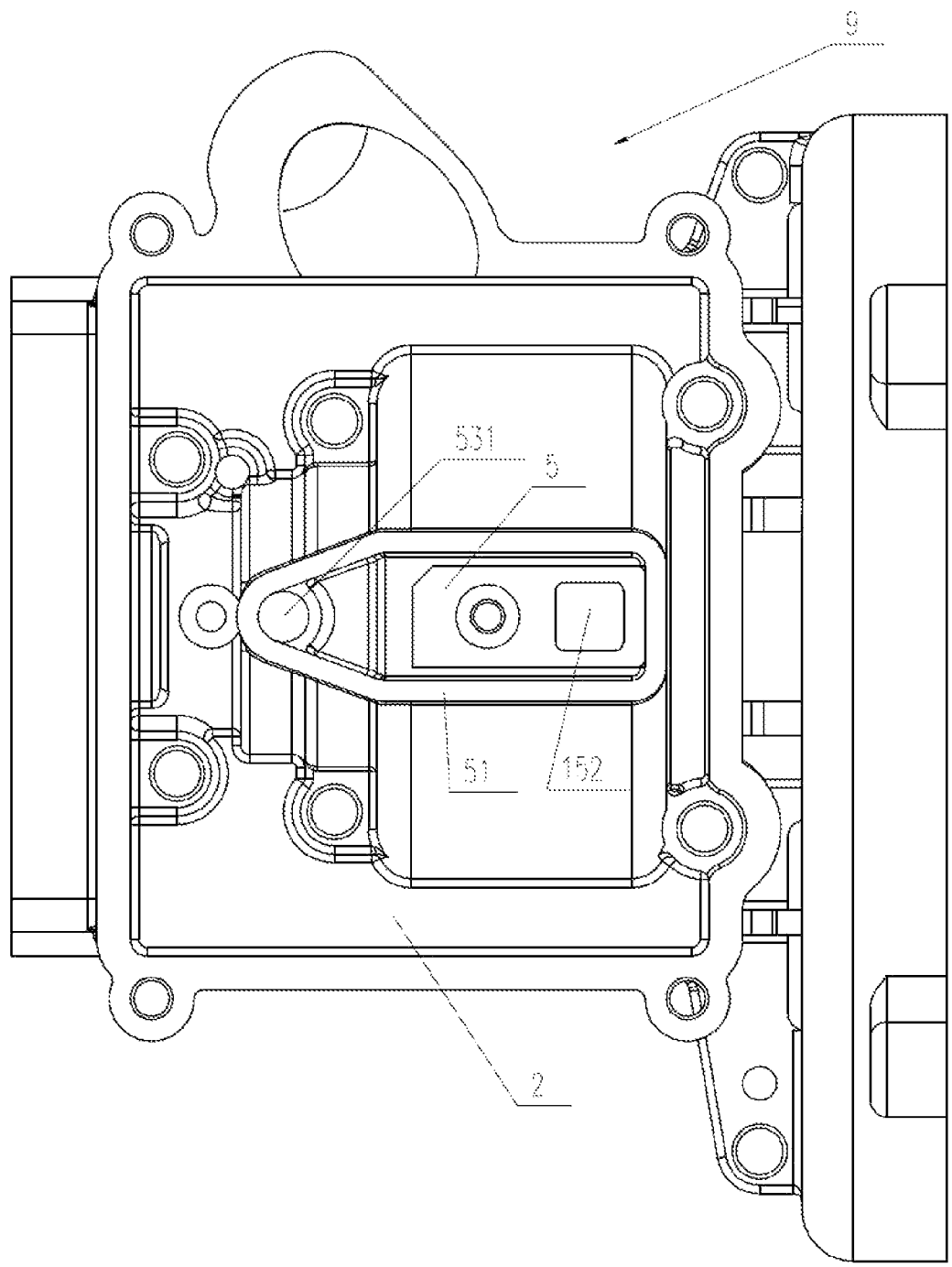
FIG. 7 is a vertical view of a cylinder block of the first embodiment of the present invention.
Figure 8:
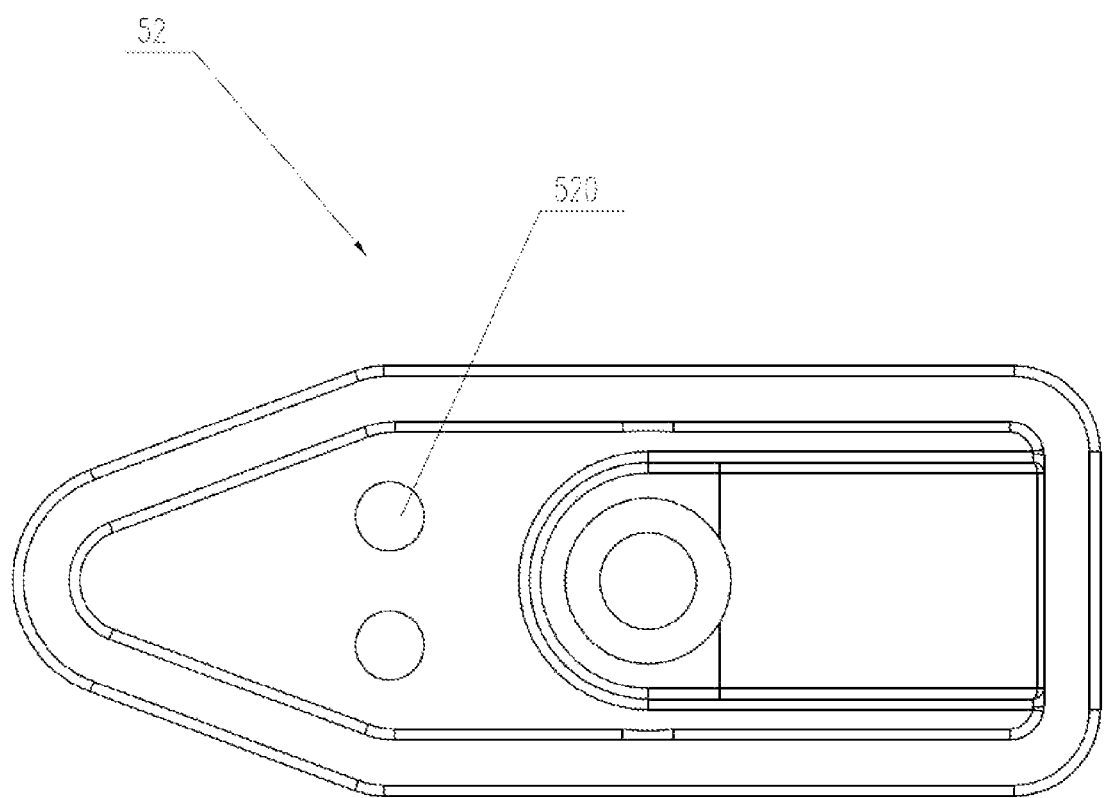
FIG. 8 is a schematic view of a bottom cover of a distribution chamber of the first embodiment of the present invention.

FIG. 1 to FIG. 11 are relevant graphical representations of a four-stroke engine and a lubricating system thereof in the first embodiment of the present invention, wherein the engine is vertically disposed and includes a crankcase 1, an oil pan 2, a cam box 3, a rocker chamber 4 and an air filter 6. The oil pan 2 is used for storing lubricating oil. The crankcase 1 is disposed above the oil pan 2. A crank shaft 10 is disposed in the crankcase 1 and is jointed with a piston 7 in a cylinder 8. The motion of the piston 7 in the cylinder 8 causes pressure change in the crankcase 1. In the lubricating system, the oil pan 2 and the crankcase 1 are communicated through an oil supply passage 21. One end of the oil supply passage 21 is provided with an oil suction portion 215. When proper lubricating oil is provided in the oil pan 2, the oil suction portion 215 can be always kept below a lubricating oil level when the engine is leant or inverted, so that the oil suction portion is ensured to suck oil from the oil pan 2. The other end of the oil supply passage 21 is an oil nozzle 210. The oil nozzle 210 is disposed below the side wall of the cylinder 8 and the bottom dead centre of the piston 7. That is, the up-and-down motion of the piston 7 cannot shield the oil nozzle 210. The oil nozzle 210 is always in an opening state. The lubricating oil sucked from the oil pan 2 is sprayed into the crankcase 1 through the oil nozzle 210. The oil supply passage 21 includes an annular passage 211. As shown in FIG. 1, FIG. 5 and FIG. 6, the annual passage 211 is respectively spliced by recesses disposed on the cylinder 8 and a cylinder block 9. An upper groove hole 214 is disposed on the recess of the annular passage 211 on the cylinder 8. A lower groove hole 213 is disposed on the recess of the annular passage 211 on the cylinder block 9. The oil in the oil supply passage 21 enters the annular passage 211 through the lower groove hole 213, flows to the upper groove hole 214 along the annular passage. The lubricating oil flows from the upper groove hole 214 into a cam cover passage 216. The cam cover passage 216 is a portion of the oil supply passage 21. The cam cover passage 216 is disposed on a cam box cover 31 (as shown in FIG. 3). The oil supply passage 21 is further provided with a first one-way valve 212. The first one-way valve 212 is opened when the inside of the crankcase 1 is under negative pressure, and is closed when the inside of the crankcase 1 is under positive pressure. The one-way valve in the embodiment refers to a control valve which can control to open and close the passages. A distribution chamber 5 is disposed above the oil pan 2. The distribution chamber is an independent cavity. In the embodiment, the distribution chamber is disposed at the bottom of the cylinder block 9. The distribution chamber may be disposed in other part of the engine according to the change of structure of the engine. The distribution chamber includes a wall 51 and a bottom cover 52 (As shown in FIG. 8). The wall 51 is formed by downwards extending from the bottom of the cylinder block 9. The bottom cover 52 is fixed at the bottom of the distribution chamber. An oil return hole 520 is disposed on the bottom cover 52 and is approximately round. Preferably, two oil return holes 520 are disposed in the embodiment. The quantity, size and shape of the oil return hole 520 can be changed differently according to different efficiency and structure demands on the engine. Oil & gas after entering the distribution chamber 5 collides with the parts in the distribution chamber 5, for example, collides with the wall 51 and the bottom cover 52, so that partial oil & gas is liquefied. Liquid lubricating oil enters the oil pan 2 through the oil return hole 520, and the rest oil & gas enters a second oil conveying passage 53 through an air outlet hole 531 to lubricate the cam box 3. Therefore, the distribution chamber 5 can effectively reduce the concentration of the oil & gas entering the cam box 3. The crankcase 1 and the distribution chamber 5 are communicated through a first oil conveying passage 15. The first oil conveying passage 15 is provided with a second one-way valve 151. Preferably, the second one-way valve is a leaf valve. The reed valve includes deformable tinsel. When the inside of the crankcase is under negative pressure, the second one-way valve 151 is closed. When the inside of the crankcase is under positive pressure, the second one-way valve 151 is opened. The distribution chamber 5 and the cam box 3 are communicated through the second oil conveying passage 53. The cam box 3 is located above the distribution chamber 51 and besides the cylinder 8. A cam mechanism is disposed in the cam box 3 to control the opening and closing of an air valve. The top of the cylinder 8 is provided with the rocker chamber 4. The cam box 3 and the rocker chamber 4 are communicated through a third oil conveying passage 34. In the embodiment, the third oil conveying passage 34 is a passage (as shown in FIG. 1) surrounding a tappet 35; therefore, two third oil conveying passages are disposed. The rocker chamber 4 and the crankcase 1 are communicated (as shown in FIG. 4) through an oil return passage 41. The oil return passage 41 is provided with a top hole 411 (as shown in FIG. 2) and a bottom hole 410. The bottom hole 410 is located at the end portion of the oil return passage 41 extending towards the inside of the rocker chamber 4. When the engine is in a state of use, lubricating oil will be accumulated in the rocker chamber 4. When the engine is used in a vertical direction, the lubricating oil is accumulated at the bottom of the rocker chamber 4. When the lubricating oil level is higher than the bottom hole 410, the lubricating oil is sucked away from the bottom hole 410 through the oil return passage 41, so that the lubricating oil in the rocker chamber 4 will not be excessive. The top hole 411 is located at the top of the rocker chamber 4. When the engine is in an inverted state, the lubricating oil is accumulated in the top of the rocker chamber 4. When the lubricating oil level is higher than the top hole 411, the lubricating oil is sucked away from the top hole 411 through the oil return passage 41. The oil return passage 41 is provided with an oil return opening 412 on the cylinder 8. The oil return opening 412 is located below the bottom dead centre of the piston. That is, the oil return opening 412 is always in an opening state, and the motion path of the piston may not pass through the oil return opening 412. The oil return passage 41 is also provided with a third one-way valve 413. When the inside of the crankcase 1 is under negative pressure, the third one-way valve 413 is opened. When the inside of the crankcase 1 is under positive pressure, the third one-way valve 413 is closed. The rocker chamber 4 and the air filter 6 are communicated through an air course 46. The opening end of the air course 46 is disposed in the middle of the rocker chamber 4. Blow-by gas produced during circulation of the lubricating oil passes through the air course 46 through the open end 460 and is exhausted to the inlet of a carburettor inlet on the air filter 6.

A flowing path for the lubricating oil in the lubricating system of the embodiment is as shown in FIG. 2. The up-and-down motion of the piston 7 causes periodical change of the pressure in the crankcase 1 and causes pressure difference generated in each part of the engine. The lubricating oil having pressure difference flows along a certain path. The pressure of the crankcase 1 is P1. The pressure of the oil pan 2 is P2. The pressure of the cam box 3 is P3. The pressure of the rocker chamber 4 is P4. The pressure of the distribution chamber 5 is P5. The atmospheric pressure is P0. When the piston 7 moves from the bottom dead centre to the upper dead center, the pressure in the crankcase 1 is reduced to produce negative pressure. At this time, the relationship of the pressure of each part is P5>P3>P4>P2>P0>P1. The first one-way valve 212, the third one-way valve 413 and a fourth one-way valve 610 are opened. Meanwhile, the second one-way valve 151 is closed. At this time, the lubricating oil in the oil pan 2 enters the crankcase 1 through the oil supply passage 21. The lubricating oil in the rocker chamber 4 enters the crankcase 1 through the oil return passage 41. The lubricating oil in the air filter 6 enters the crankcase 1 through an oil returning passage 61. The lubricating oil entering the crankcase is beat into mist shape by a crank shaft component to lubricate the parts in the entire crankcase. When the piston moves from the upper dead center to the bottom dead centre, the pressure in the crankcase 1 is increased to produce positive pressure. At this time, the relationship of the pressure is P1>P5>P3>P4>P2>P0. The first one-way valve 212, the third one-way valve 413 and the fourth one-way valve 610 are closed. The second one-way valve 151 is opened. At this time, the oil mist in the crankcase 1 passes through the first oil conveying passage 15 through an air inlet 152 and enters the distribution chamber 5. The pressure in the distribution chamber 5 is increased. Meanwhile, in the distribution chamber 5, the oil mist collides with the wall 51, the bottom cover 52 and the like in the distribution chamber 5, so that partial oil mist becomes liquid oil, and the liquid oil enters the oil pan through the oil return hole 520. The remaining oil mist passes through the second oil conveying passage 53 through the air outlet hole 531 and enters the cam box 3 to lubricate the parts in the cam box 3. The oil mist continuously enters the rocker chamber 4 from the cam box 3 through the third oil conveying passage 34 to lubricate the parts in the rocker chamber 4. The lubricating oil in the rocker chamber 4 enters the oil return passage 41 through the bottom hole 411 or the top hole 410, and then returns to the crankcase 1. Partial oil mist and blow-by gas in the rocker chamber 4 pass through the air course 46 and enter the air filter 6. The air filter 6 separates the lubricating oil and the blow-by gas through oil & gas separation. The embodiment utilizes the change of pressure in the crankcase 1 to cause pressure difference produced in each part, so that the lubricating oil flows in the engine along a certain lubricating passage. However, the present invention is also applied to a four-stroke engine which depends on an oil pump for oil supply.

Figure 9:
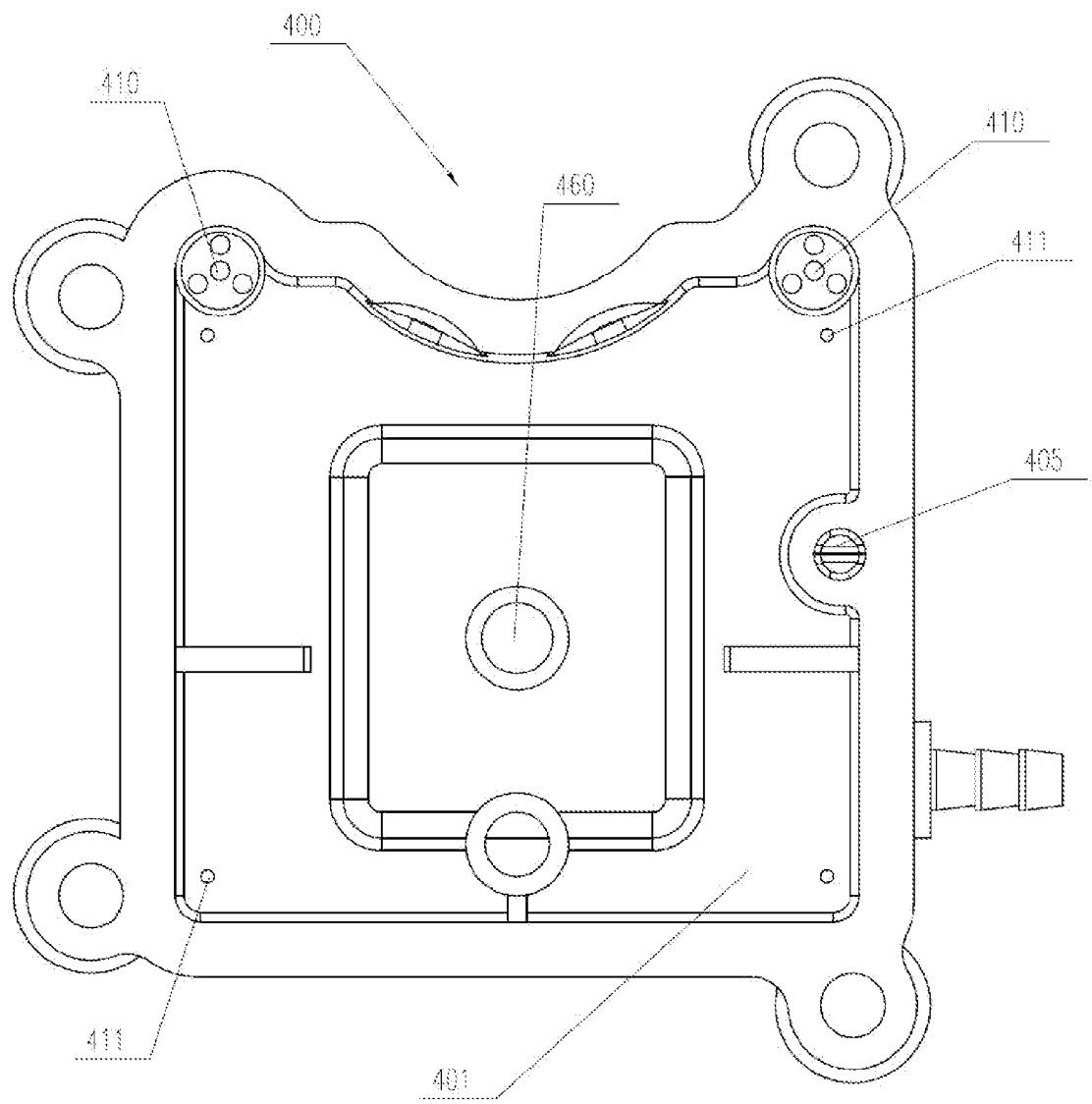
FIG. 9 is a vertical view of a rocker chamber cover of the first embodiment of the present invention.
Figure 10:
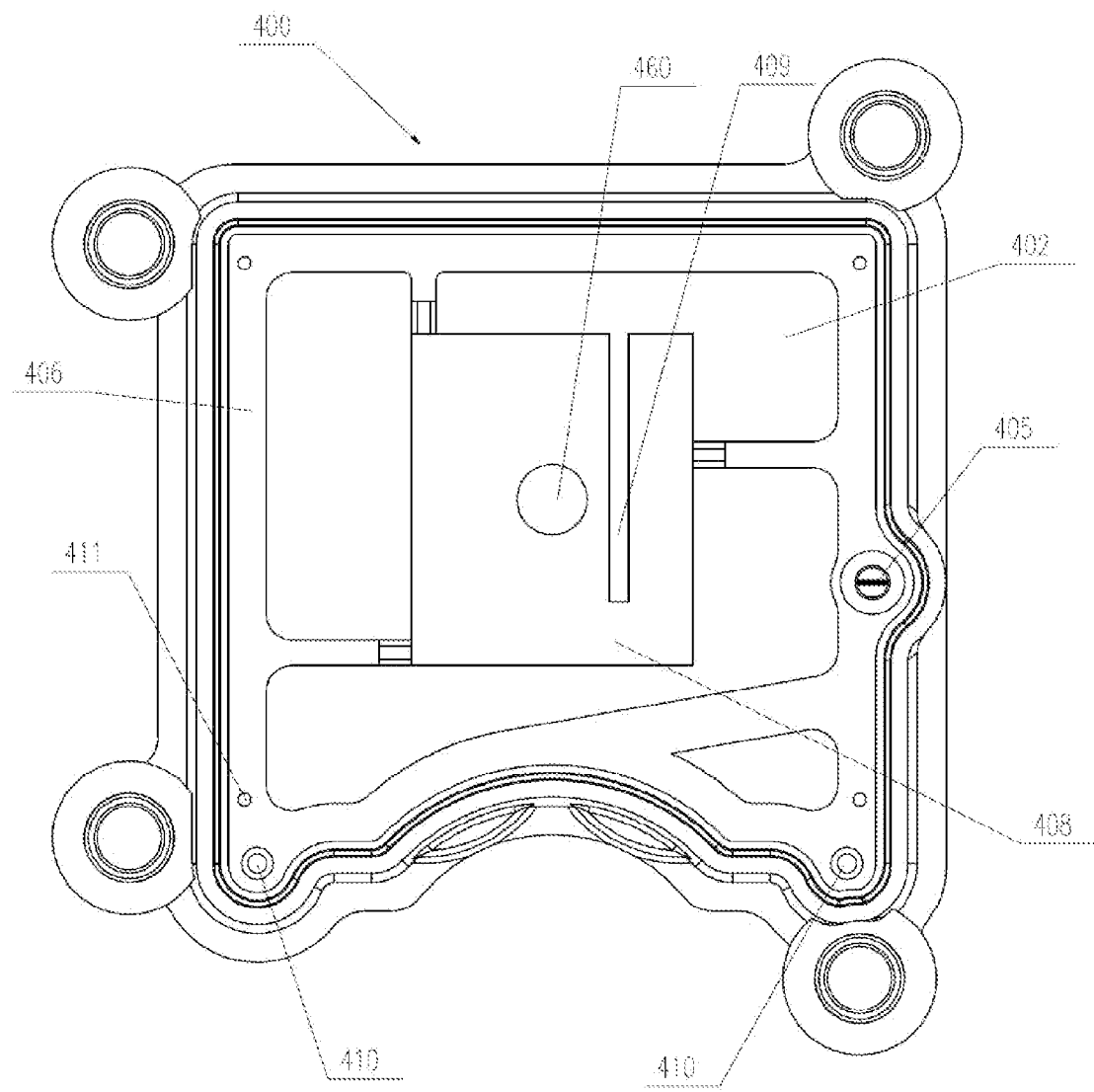
FIG. 10 is a top view of the rocker chamber cover of the first embodiment of the present invention.
Figure 11:
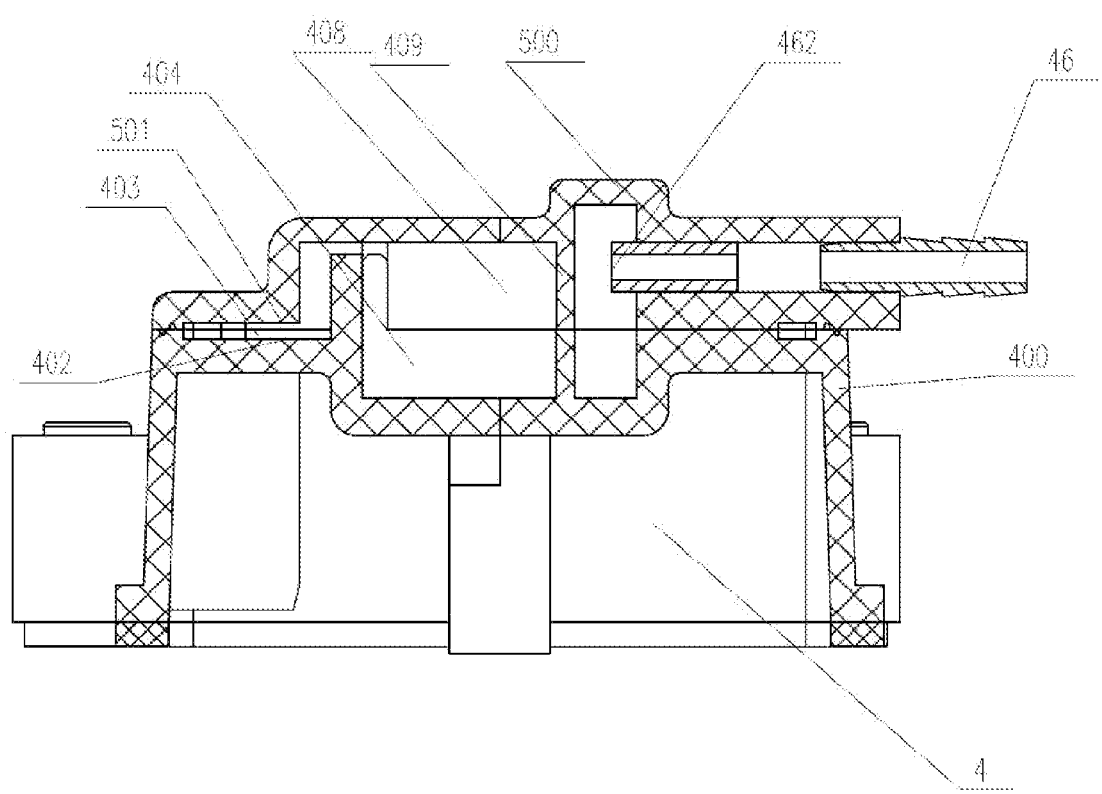
FIG. 11 is a top cross-sectional view of the cylinder of the first embodiment of the present invention.
Figure 12:
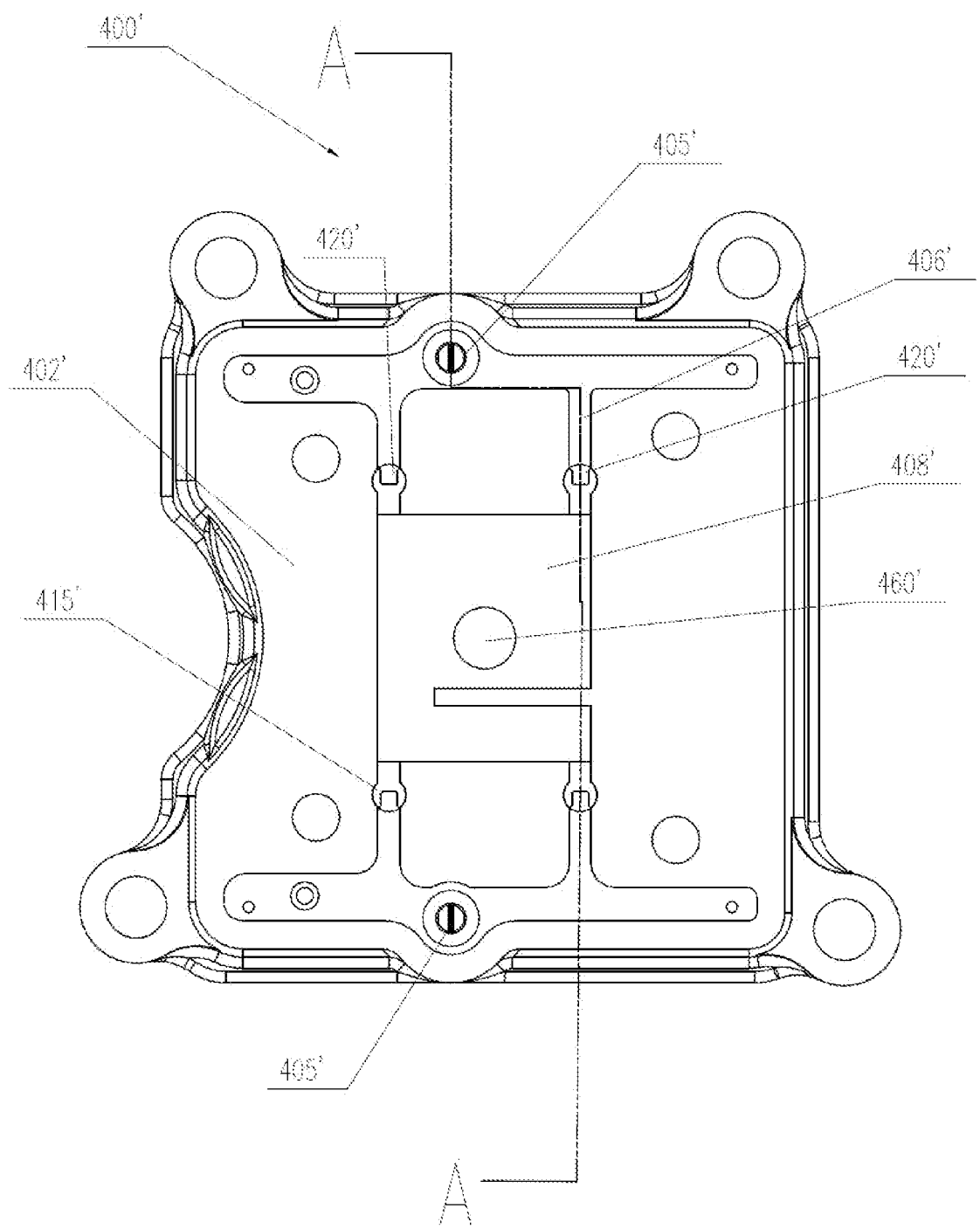
FIG. 12 is a vertical view of a rocker chamber cover of a second embodiment of the present invention.
Figure 13:
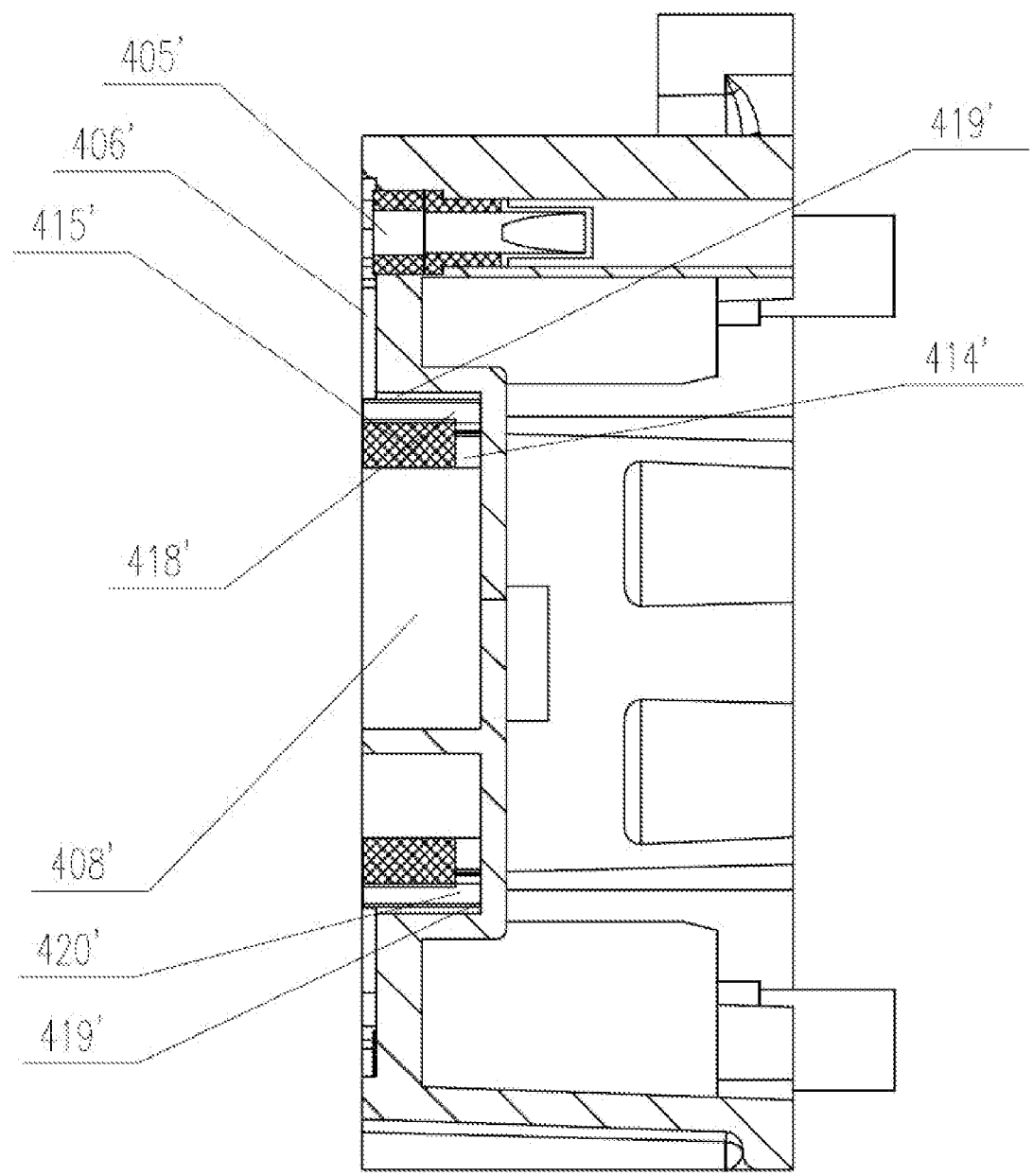
FIG. 13 is a cross-sectional view of an A-A section of FIG. 12.
Figure 14:
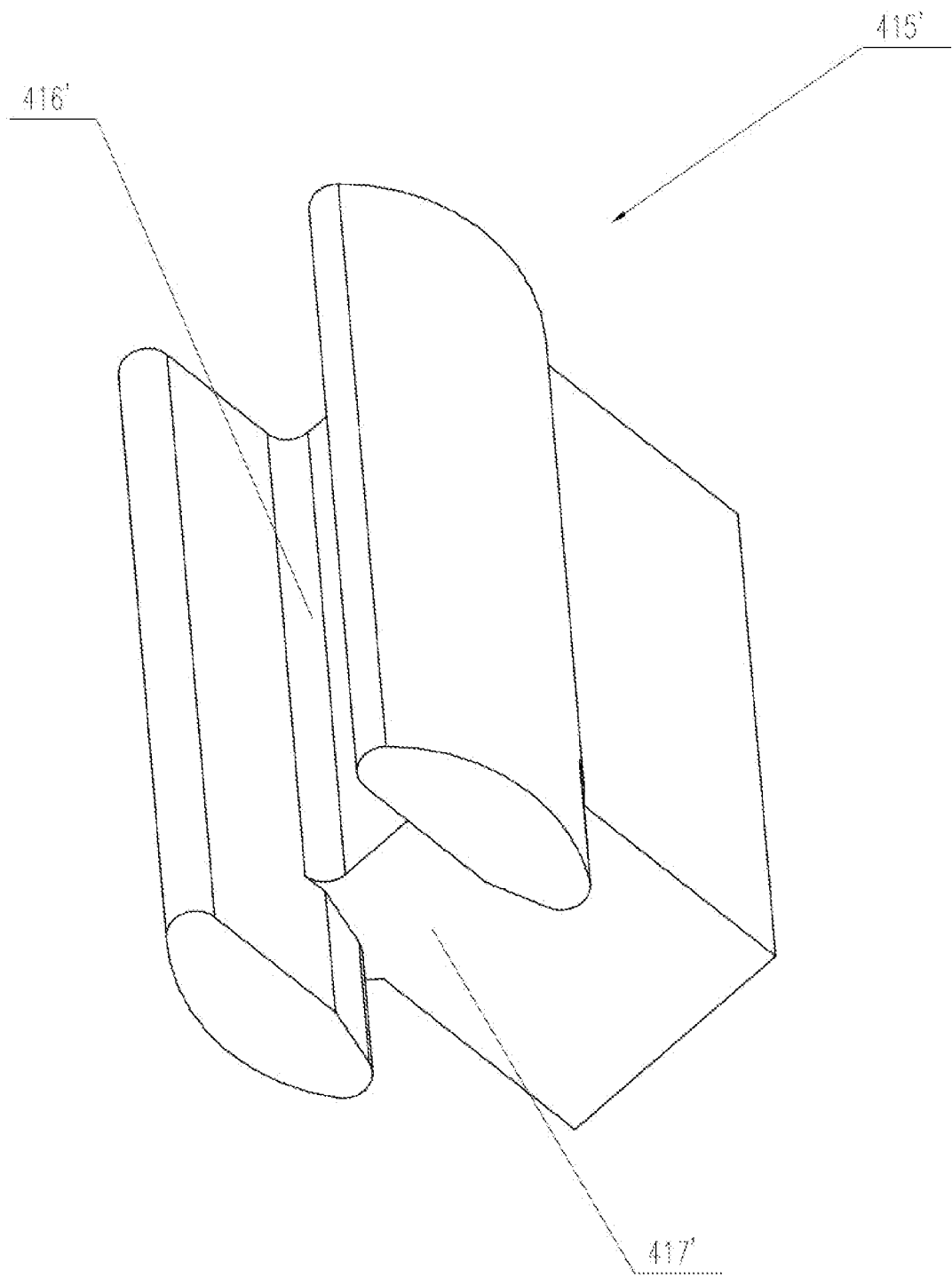
FIG. 14 is a schematic view of a plug of the second embodiment.

FIGS. 9-11 show a rocker chamber cover of the engine of the embodiment. The rocker chamber cover 400 is disposed at the top of the rocker chamber 4. Oil holes are disposed on the rocker chamber cover 400. In the embodiment, the oil holes refer to the bottom hole 410, the top hole 411 and an oil return hole 405. Preferably, two bottom holes are disposed as the bottom holes 410 of the oil return passage. Four top holes 411 are disposed at the four corners of the upper wall 401 of the rocker chamber cover 400. When the engine is in an inverted state, at least one top hole 411 can be ensured to be below the lubricating oil level no matter the engine is leant to any direction. The middle of a cylinder cover 400 is provided with an opening end 460. The mixed gas formed by the oil mist and blow-by gas in the rocker chamber leaves the rocker chamber through the opening end 460. As shown in FIG. 10 and FIG. 11, a separation cavity 408 and a connection channel 403 are disposed between the outer wall 402 of the rocker chamber cover and the lower wall 501 of the cover plate. The separation cavity and the connection channel are spliced by the rocker chamber cover 400 and a cover plate 500. The connection channel 403 includes a groove 406. The groove 406 is formed by sunk portions on the outer wall 402 of the rocker chamber cover and the lower wall 501 of the cover plate. Surely, the groove can also be formed even if the suck portion is disposed on only one of the rocker chamber cover and the cover plate. The connection channel 403 is distributed on a plane vertical to the piston. The bottom hole 410, the top hole 411, the oil return hole 405 and the separation cavity 408 are communicated by the connection channel 403. The bottom hole 410 and the top hole 411 suck the lubricating oil from the inside of the rocker chamber 4 to the outside of the rocker chamber. The lubricating oil flows into the oil return hole 405 along the groove 406 on the outer wall 402 and then flows into the crankcase 1. The connection channel formed by the rocker chamber cover and the cover plate to convey lubricating oil simplifies an oilway structure on the top of the rocker chamber and sufficiently utilizes the space of the rocker chamber cover. The middle of the outer wall 402 is provided with the separation cavity 408. The separation cavity 408 consists of a notch 404 on the outer wall 402 and the cover plate 500, and is approximately square. A filtering material (not shown in the figure), for example a metal gauze, is disposed in the separation cavity 408. The filtering material separates the mixed gas entering the separation cavity 408 from the opening end 460 into gas and oil liquid, thus decreasing the concentration of the oil mist in the mixed gas, reducing the consumption of the lubricating oil, and being capable of reducing emission. The separated gas leaves the separation cavity 408 through a cover hole 462 and flows towards the air filter 6. A baffle 409 is also disposed in the separation cavity 408. The baffle is formed by the bulging of the inner wall of the separation cavity. The baffle 409 extends the flowing path of the mixed gas in the separation cavity 408, thus enhancing the separation effect.

FIGS. 12-15 show an embodiment of another rocker chamber cover of the present invention. In the embodiment, two oil return holes 405' are disposed on a rocker chamber cover 400'. The oil return holes 405' are located at the two opposite sides of the rocker chamber cover. Each oil return hole 405' is communicated with one oil return passage 41.

Figure 15:
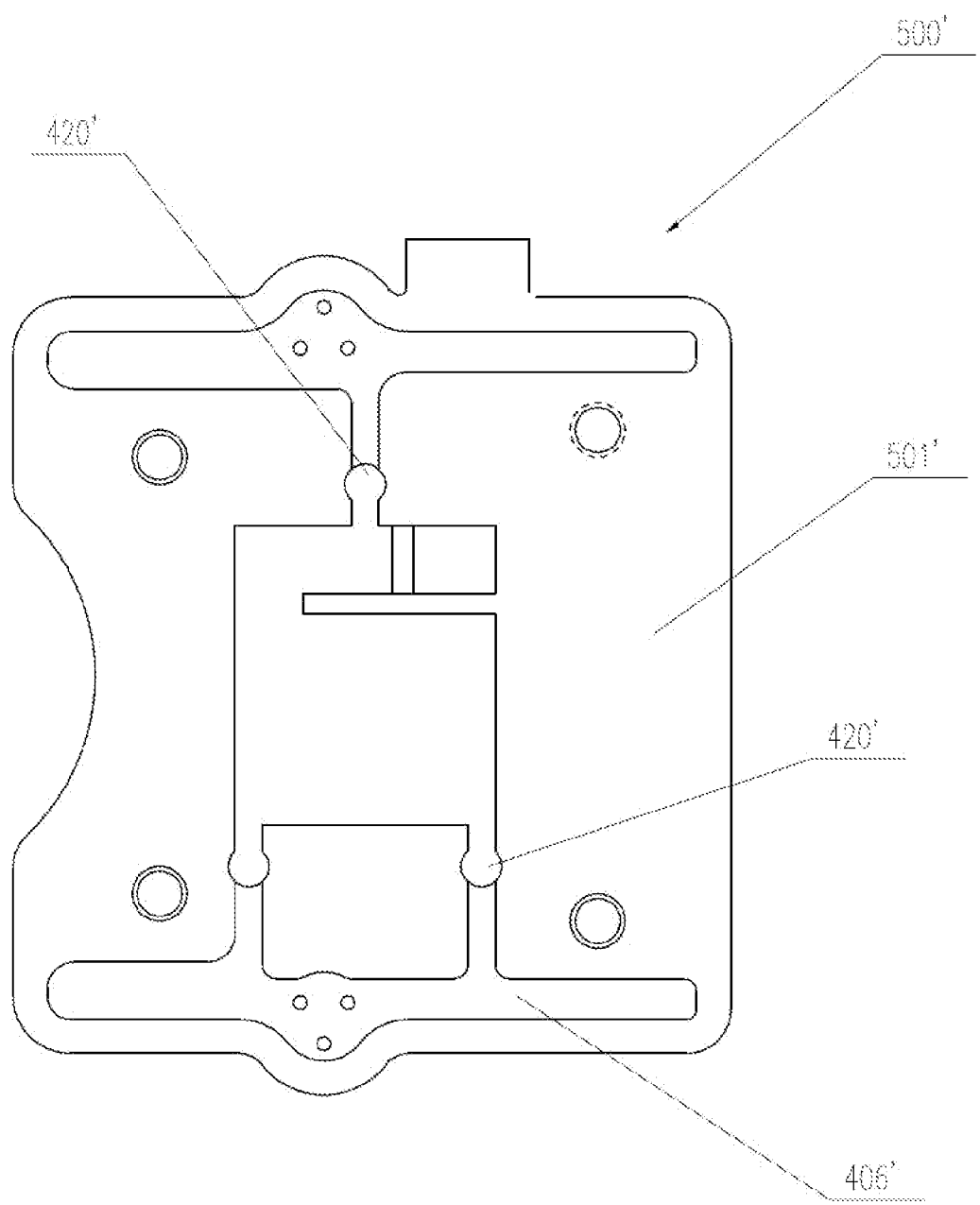
FIG. 15 is a schematic view of a cover plate of the second embodiment.

Therefore, in the embodiment, two oil return passages 41 are provided (not shown in the figures). The two oil return passages 41 are respectively communicated with the rocker chamber and the crankcase. Oil drain passages 420' are disposed in a separation cavity 408'. A plurality of oil drain passages are provided and may be distributed on the rocker chamber cover 400' or a cover plate 500' to drain the oil accumulated in the separation cavity out of the separation cavity. The oil drain passage is close to the inner wall 419' of the separation cavity and consists of the inner wall 419' and a plug 415'. The oil drain passage utilizes partial inner wall 419' thus saving space in the separation cavity. The plug 415' may either be an independent part or integrated with the rocker chamber cover 400' or the cover plate 500'. The plug 415' may be made of metal, plastic or other materials. In the embodiment, the plug 415' is made of plastic for convenient manufacturing. The oil drain passage 420' includes an oil drain hole 414' and a passageway 418'. The central axis of the oil drain hole 414' and the central axis of the passageway 418' are vertical to each other. The oil drain hole 414' is communicated with the oil return hole 405'. The oil drained from the oil drain hole 414' passes through the oil return hole 405' and enters the oil return passage 41, and then returns back into the crankcase to participate in lubricating the crankcase. Preferably, the oil drain hole 414' is disposed close to the top corner of the square separation cavity 408', so that at least one oil drain hole is below the lubricating oil level in the separation cavity to drain the accumulative lubricating oil when the engine is working under various gestures. The separation cavity may also have different shapes according to different engine structures without departing from the spirit of the present invention as long as at least one of the oil drain holes in the separation cavity is immersed below the oil level when the engine is in a working state. In the embodiment, four oil drain passages 420' are disposed on the rocker chamber cover 400' and three oil drain passages 420' are disposed on the cover plate 500'. The oil drain passages on the cover plate 500' enable the oil in the separation cavity to be drained smoothly even if the engine is used in an inverted state. The oil drain hole 414' is communicated with the oil return hole 405' through a groove 406' on the outer wall of the rocker chamber cover. The oil drain hole 414' consists of a notch 417' on the plug 415' and the inner wall 419' of the separation cavity. The plug 415' is disposed in the separation cavity. The plug 415' is provided with a plug slot 416'. A passageway 418 is formed by the plug slot and the inner wall 419'. The lubricating oil in the separation cavity 408' enters the passageway 418' through the oil drain hole 414', then flows into the groove 406', and then enters the oil return passage 41 through the oil return hole 405'. Similarly, when the engine is inverted, the lubricating oil enters the groove through the oil drain hole 414' on the cover plate 500' (as shown in FIG. 15), and then enters the oil return passage 41 through the oil return hole 405'.

Figure 16:
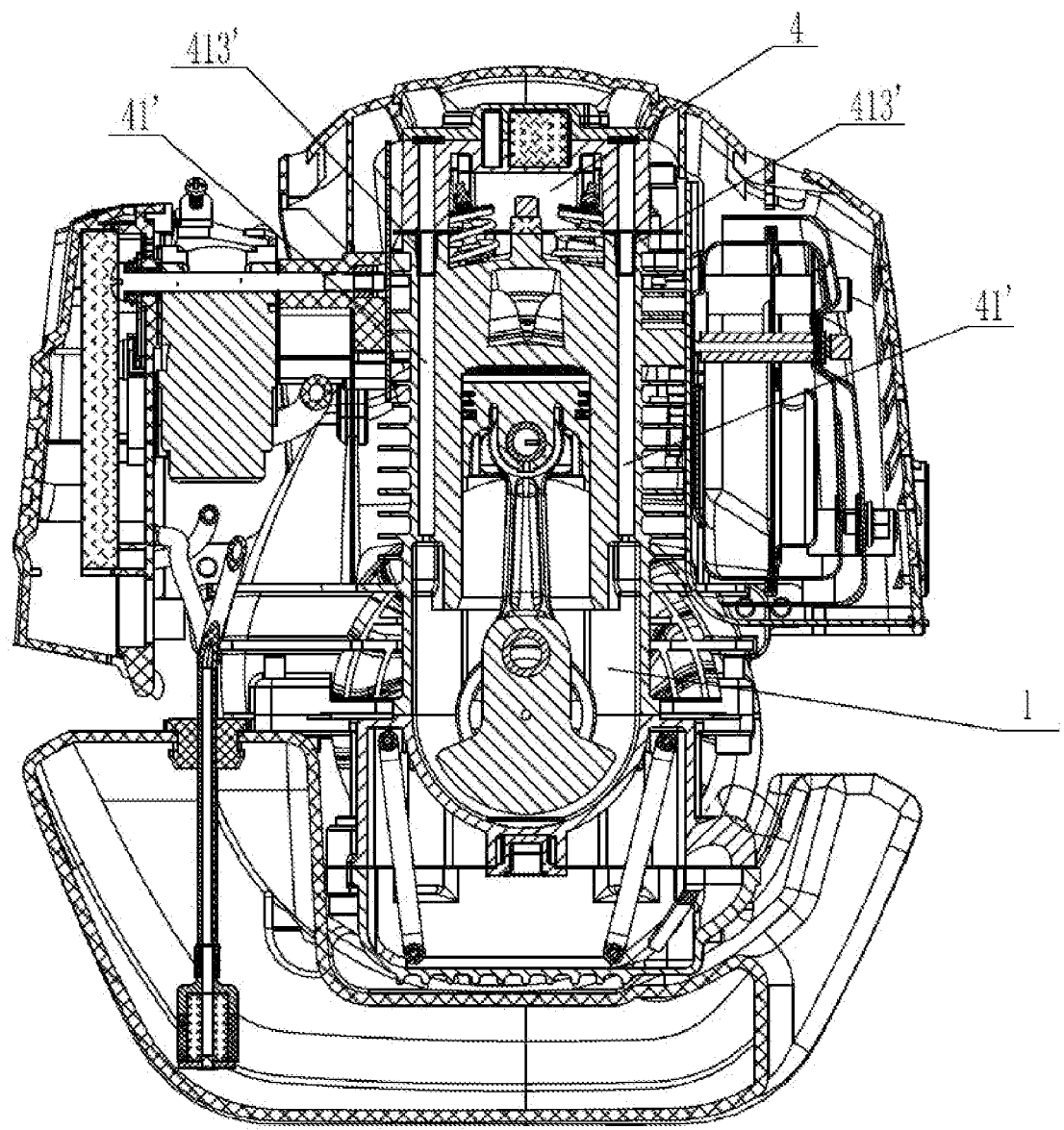
FIG. 16 is a top cross-sectional view of a third embodiment of the present invention.
Figure 17:
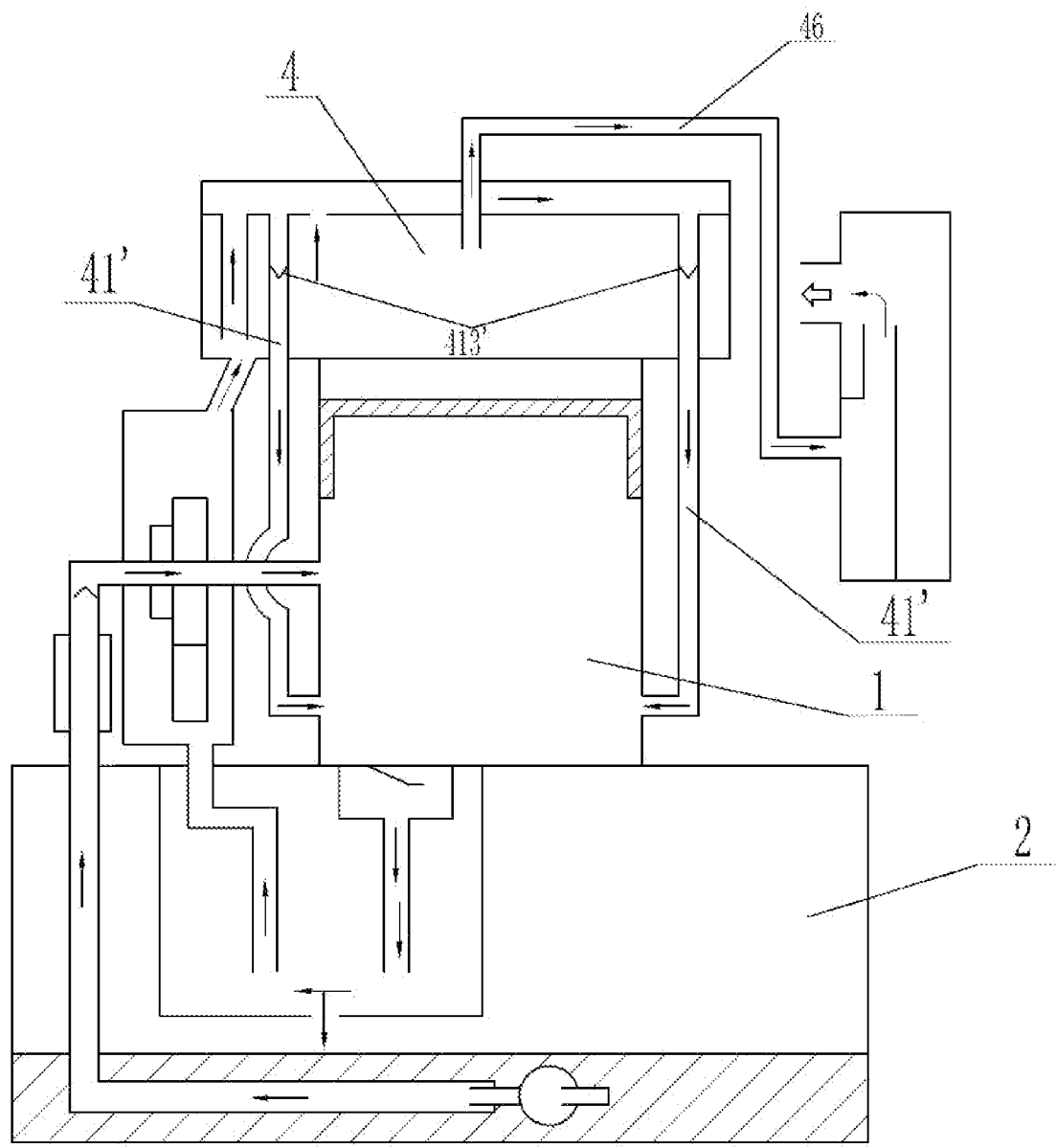
FIG. 17 is a schematic view of a lubricating system of the third embodiment of the present invention.

Further referring to FIG. 16 and FIG. 17, schematic views of a four-stroke engine and a lubricating system thereof corresponding to the third embodiment of the present invention are shown. The structure of the embodiment and the structure of the first embodiment are mostly same or similar, and the difference mainly lies in the disposing of an oil return passage between the rocker chamber 46 and the crankcase 1; therefore, corresponding descriptions are only made to the oil return passage. In the embodiment, two oil return passages 41' are disposed between the rocker chamber 46 and the crankcase 1. The two oil return passages 41' are generally distributed at the two sides of the rocker chamber 46 and/or the crankcase 1 in parallel. Moreover, a third one-way valve 413' is disposed in each oil return passage 41', so that lubricating oil can only flow from the rocker chamber 46 towards the crankcase 1; otherwise, the oil return passage will be obstructed. In this way, compared with the single oil return passage 41 in the first embodiment, this disposing manner of the oil return passage enables the oil return efficiency from the rocker chamber 46 to the crankcase 1 higher, and reduces the consumption of the lubricating oil. In addition, different from the first embodiment, an oil return passage between the air filter 6 and the crankcase 1 is not needed in the embodiment; therefore, the air filter and the crankcase are not communicated with each other.

The four-stroke engine lubricating system provided by the present invention simplifies a lubricating oilway in the engine, not only the engine to both run normally when being used in a leant or inverted manner, but also can keep excellent lubricating effect, and also effectively reduces the consumption of the lubricating oil when the engine is working, and decreases contaminant emission.

We claim:
1. A four-stroke engine lubricating system, wherein the four-stroke engine comprises:
an oil pan for storing lubricating oil;
a crankcase;
a cam box;
a rocker chamber; and
a distribution chamber communicated with the oil pan and used for separating oil & gas mixture into oil mist and liquid oil;
a cylinder, and
a cylinder block,
the four-stroke engine lubricating system is characterized in that the lubricating system is as follows: the oil pan and the crankcase are communicated through an oil supply passage, and a first one-way valve is disposed in the oil supply passage; the oil supply passage includes an annular passage which is respectively spliced by recesses disposed on the cylinder and the cylinder block; the crankcase and the distribution chamber are communicated through a first oil conveying passage, and a second one-way valve is disposed in the first oil conveying passage; the distribution chamber and the cam box are communicated through a second oil conveying passage; the cam box and a rocker chamber are communicated through a third oil conveying passage; the rocker chamber and the crankcase are communicated through at least one oil return passage, and a third one-way valve is disposed in the oil return passage.

2. The four-stroke engine lubricating system according to claim 1, wherein the oil supply passage is at least partially spliced by the cylinder and the cylinder block.

3. The lubricating system according to claim 2, wherein one end of the oil supply passage is provided with an oil nozzle; the oil nozzle is located on the cylinder and below a bottom dead centre of a piston so that the oil nozzle is in an opening state all the time.

4. The four-stroke engine lubricating system according to claim 1, wherein the quantity of the at least one oil return passage is two, and the third one-way valve is disposed in each oil return passage so that lubricating oil can only flow from the rocker chamber towards the crankcase.

5. The four-stroke engine lubricating system according to claim 4, wherein the oil return passage is provided with an oil return opening on the cylinder; the oil return opening is located below the bottom dead centre of a piston, so that the oil return opening is in an opening state all the time.

6. The four-stroke engine lubricating system according to claim 4, wherein the oil return passage is provided with a bottom hole and a top hole; when the four-stroke engine is used in an upright manner, the lubricating oil in the rocker chamber enters the oil return passage through the bottom hole; and when the four-stroke engine is used in an inverted manner, the lubricating oil in the rocker chamber enters the oil return passage through the top hole.

7. The four-stroke engine lubricating system according to claim 1, wherein the four-stroke engine further comprises an air filter; the rocker chamber and the air filter are communicated through an air course.

8. The four-stroke engine lubricating system according to claim 1, wherein the distribution chamber is a cavity chamber consisting of a wall and a bottom cover.

9. The four-stroke engine lubricating system according to claim 8, wherein an oil return hole is disposed on the bottom cover, and the lubricating oil enters the oil pan through the oil return hole.

10. The four-stroke engine lubricating system according to claim 8, wherein a hole and a hole are disposed in the distribution chamber; oil & gas in the first oil conveying passage enter the distribution chamber through the hole; and the oil & gas in the distribution chamber enter the second oil conveying passage through the hole.

11. The four-stroke engine lubricating system according to claim 1, further comprising an oil pump, wherein the oil pump provides power for the lubricating oil to flow in the lubricating system.

\* \* \* \* \*